Figure 1:
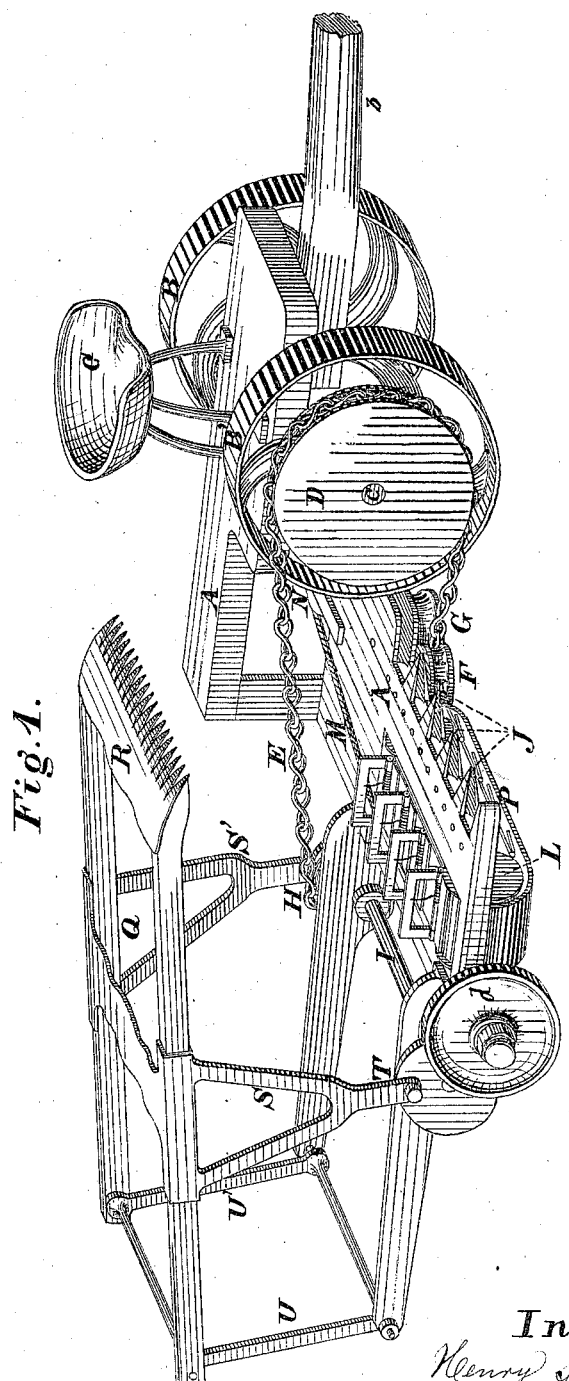

2 Sheets--Sheet 1.

H. S. GORDON.
Improvement in Harvesters.

No. 132,003. Patented Oct. 8, 1872.

H. S. GORDON.
Improvement in Harvesters.
No. 132,003. Patented Oct. 8, 1872.
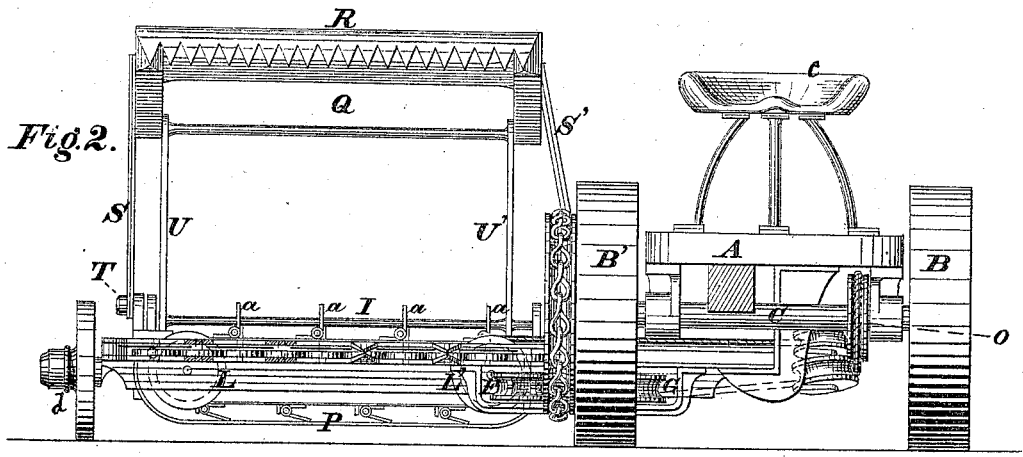
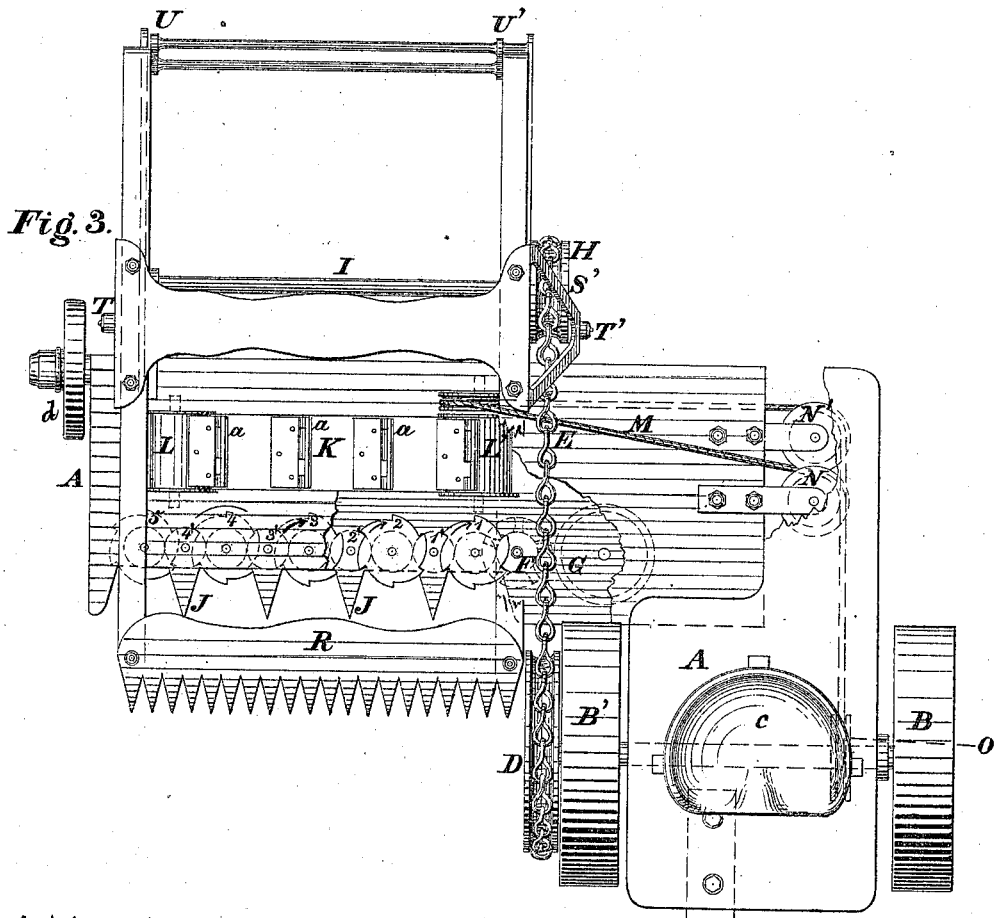

Attest.  
Inventor.  
Henry S. Gordon  
his  
T. Van Kannel & Co  
attys